Oct. 12, 1926.
W. C. STEVENS
1,603,249
MACHINE FOR CLEANING TIRE CORES
Filed Jan. 9, 1922
8 Sheets-Sheet 2

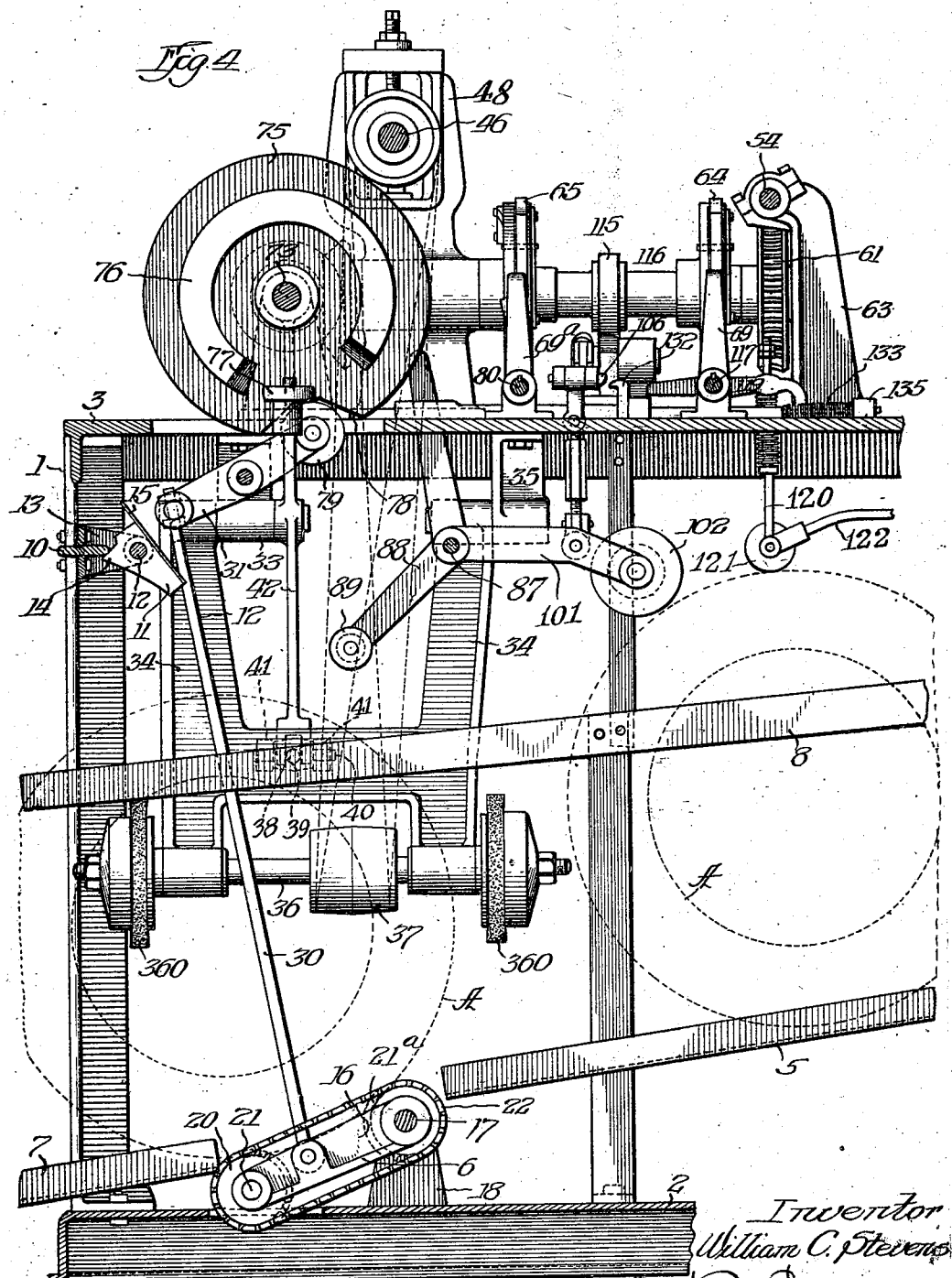

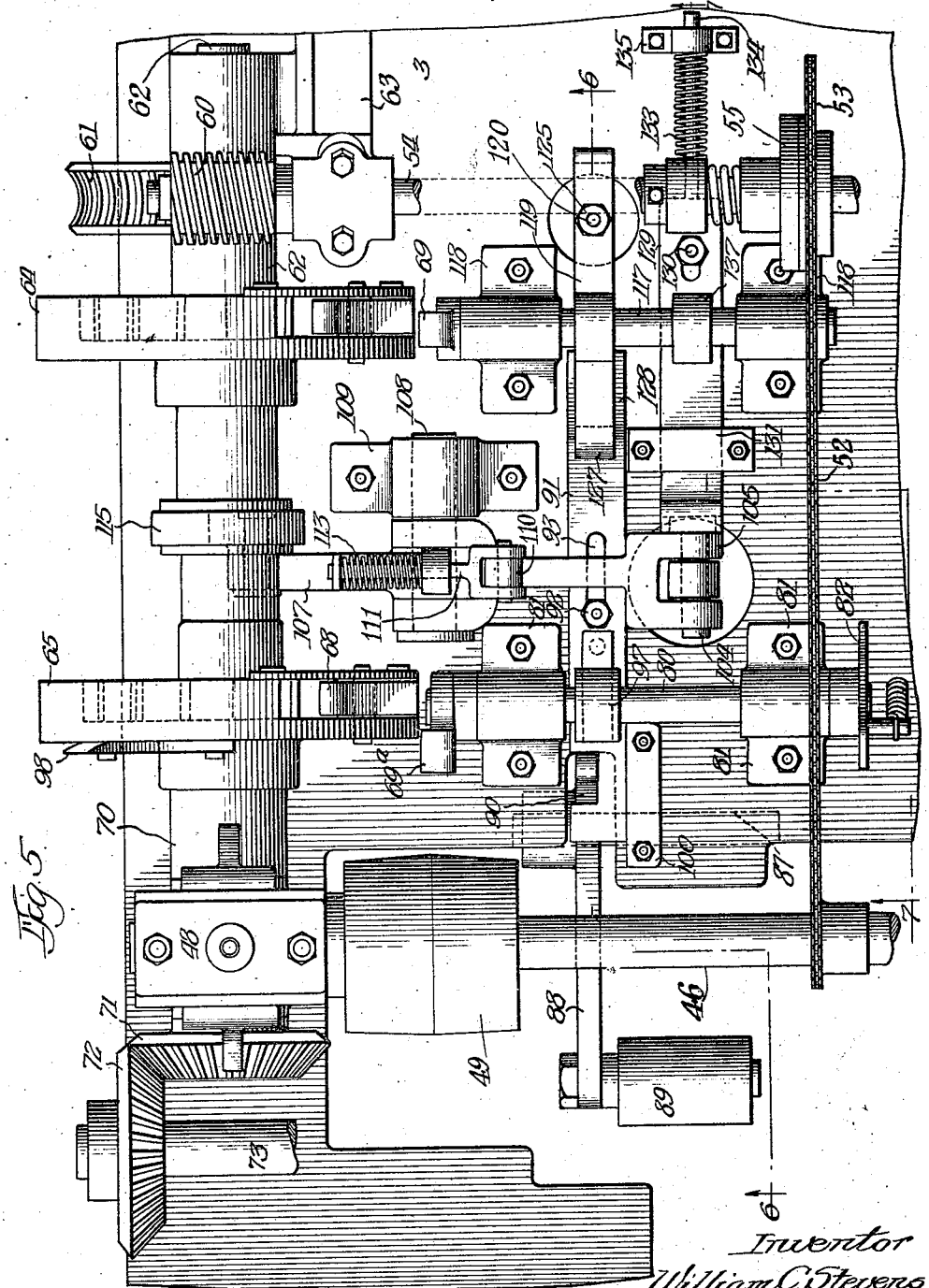

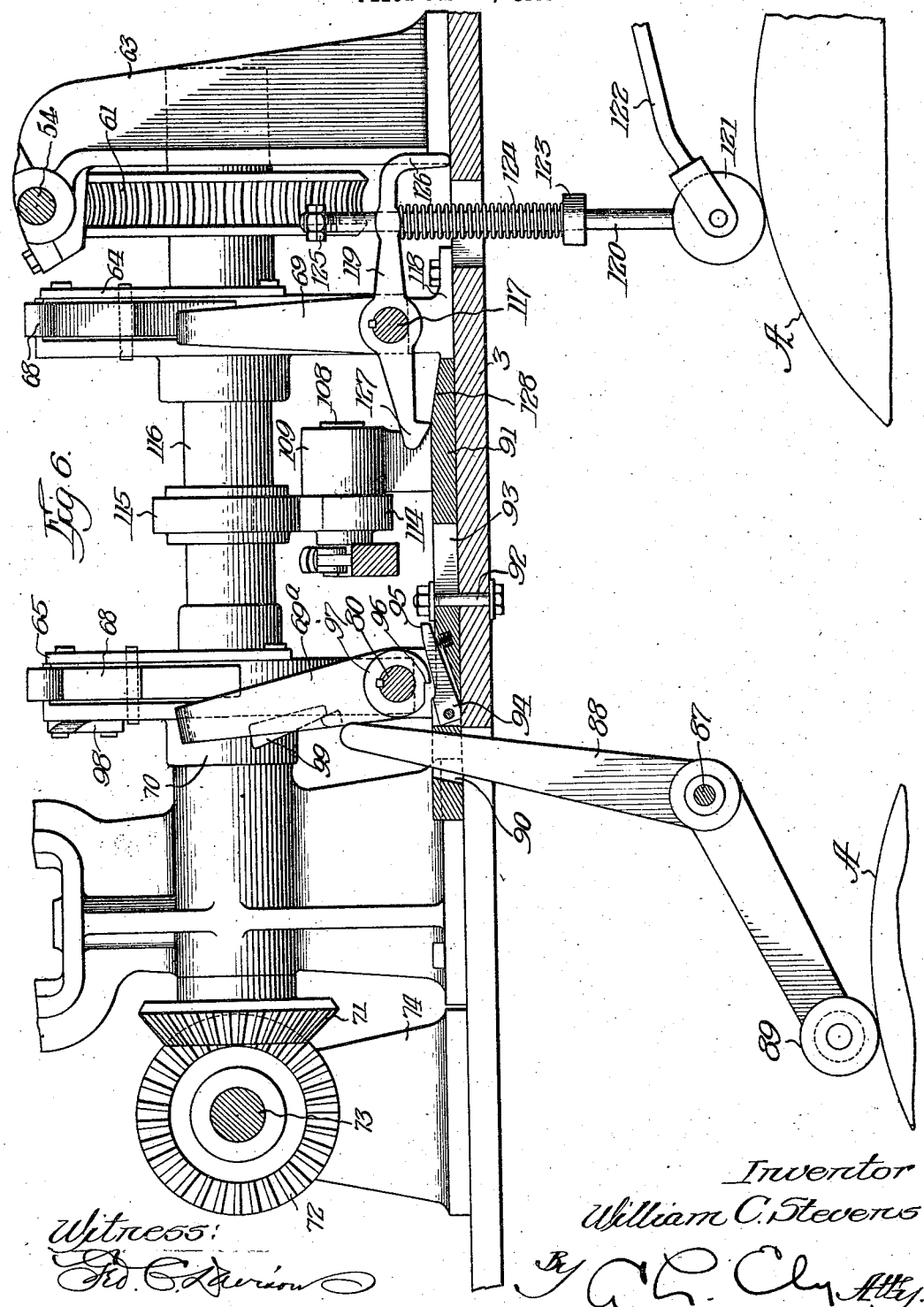

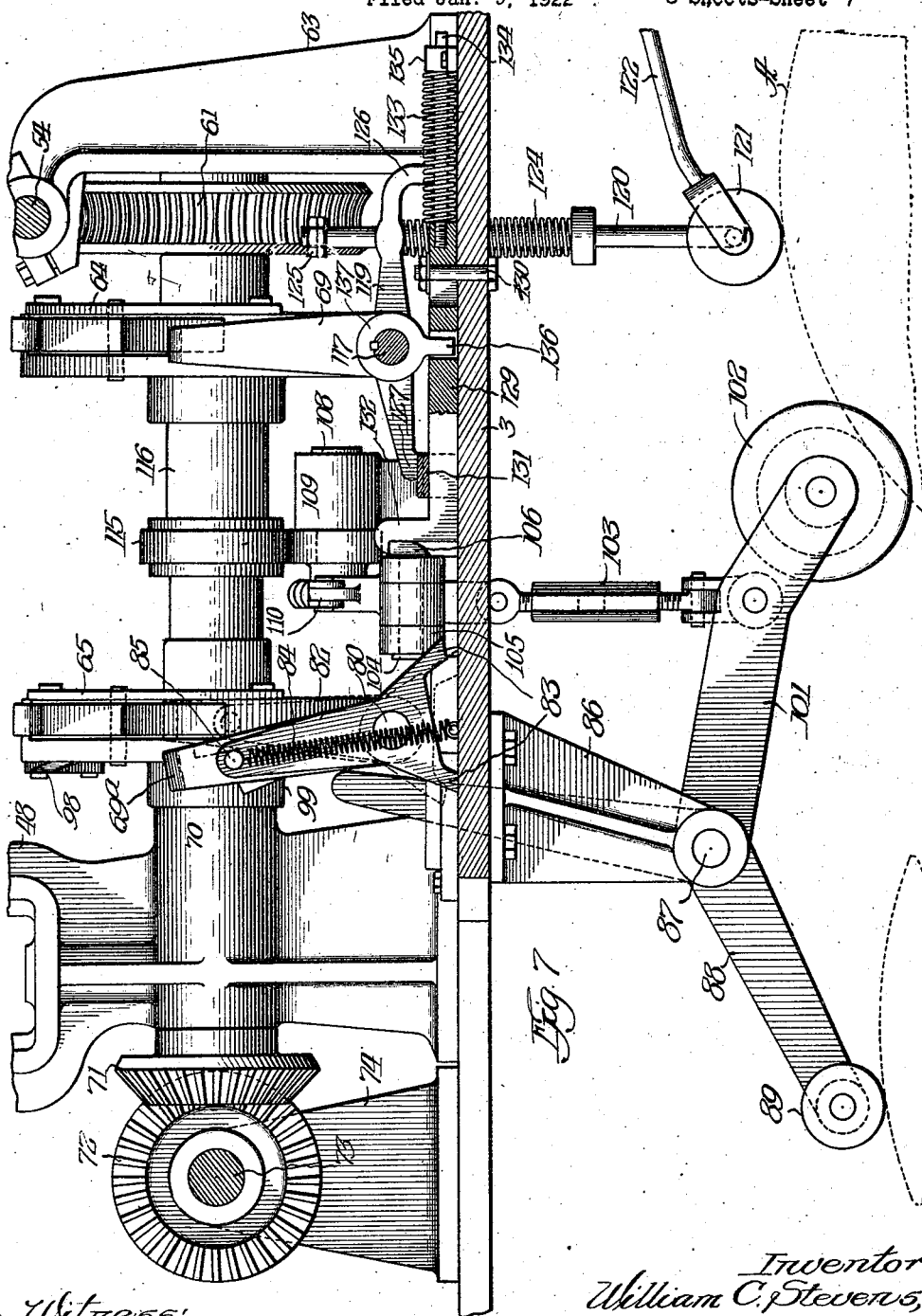

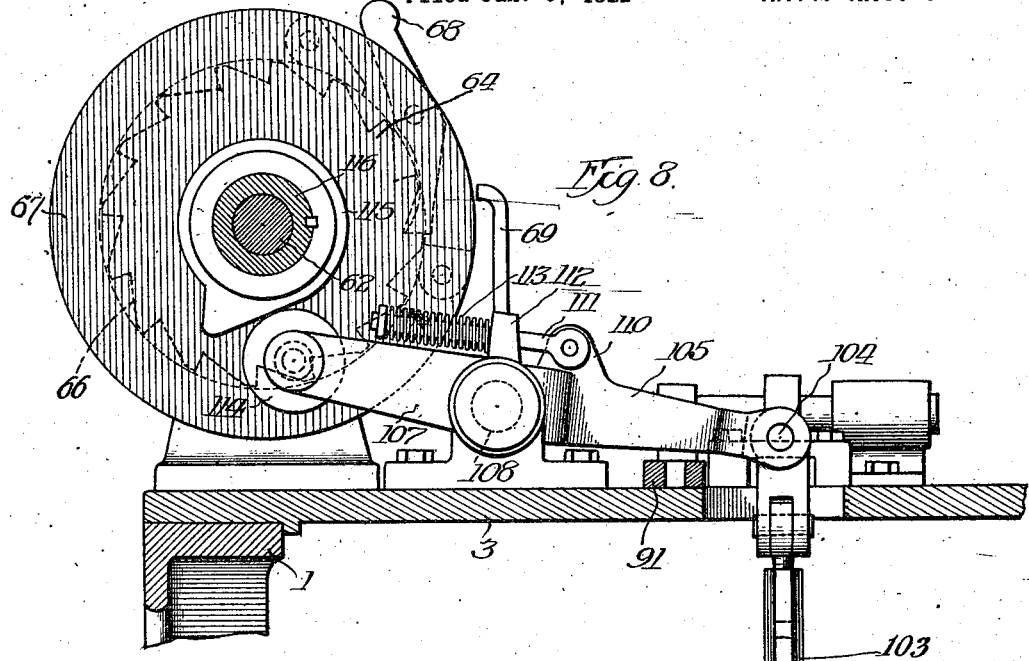
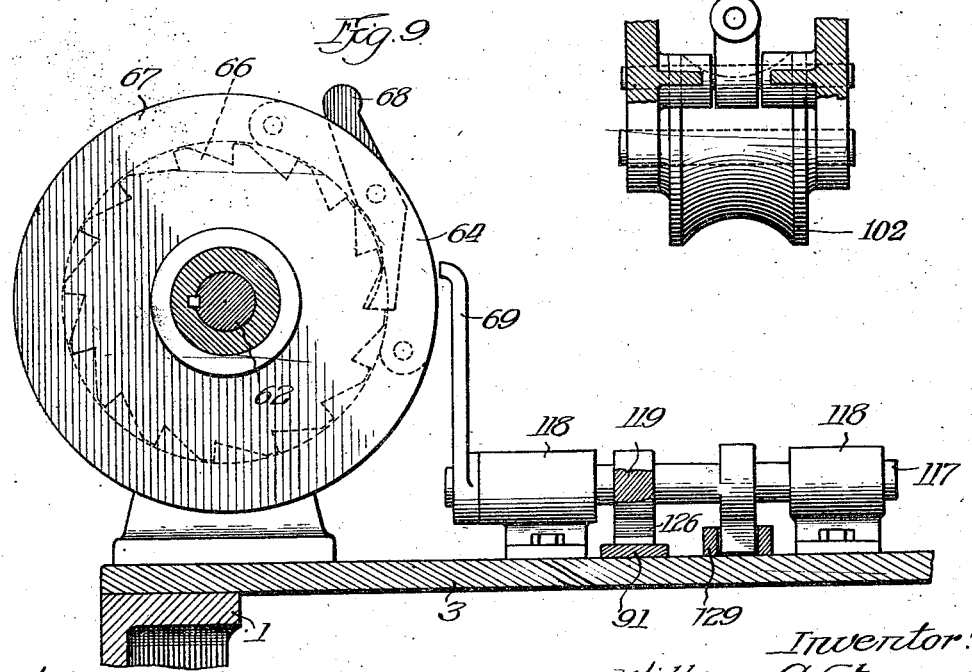

Patented Oct. 12, 1926.

1,603,249

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

MACHINE FOR CLEANING TIRE CORES.

Application filed January 9, 1922. Serial No. 527,829.

In the manufacture of pneumatic tires, the cores upon which the tires are built are given a coating of rubber cement on their lower side walls, in order to obtain adherence of the skirts or edges of the fabric plies to the core in the process of shaping the fabric. After vulcanization the rubber adheres to the core and before a fresh tire can be built thereon, the core must be cleaned of the adhering particles of rubber.

Machines have been designed for the purpose of removing these particles of rubber, and the object of the present invention is to improve upon machines for this work, so that the machine will automatically clean the cores and the work may be done more rapidly and better than by the machines of the prior art, without any manual labor or superintendence whatever.

In the drawings accompanying this application is shown one form of machine for accomplishing the results desired, but it will be understood that the showing is for the purpose of enabling one skilled in the art to practise the invention, and I am not restricted to conformity with details or arrangement of parts in following the invention.

In the drawings:

Fig. 4 is a vertical longitudinal sectional view of the discharging end of the machine in the act of discharging a cleaned core, and admitting a fresh core to take its place.

Fig. 5 is a plan view of the top of the machine.

Fig. 6 is a longitudinal sectional view of the top of the machine, the view being taken on the line 6—6 of Fig. 5.

Fig. 7 is a similar view on line 7—7 of Fig. 5.

Fig. 8 is a detail of the releasing mechanism.

Fig. 9 is a detail of the latching mechanism.

Figure 1:
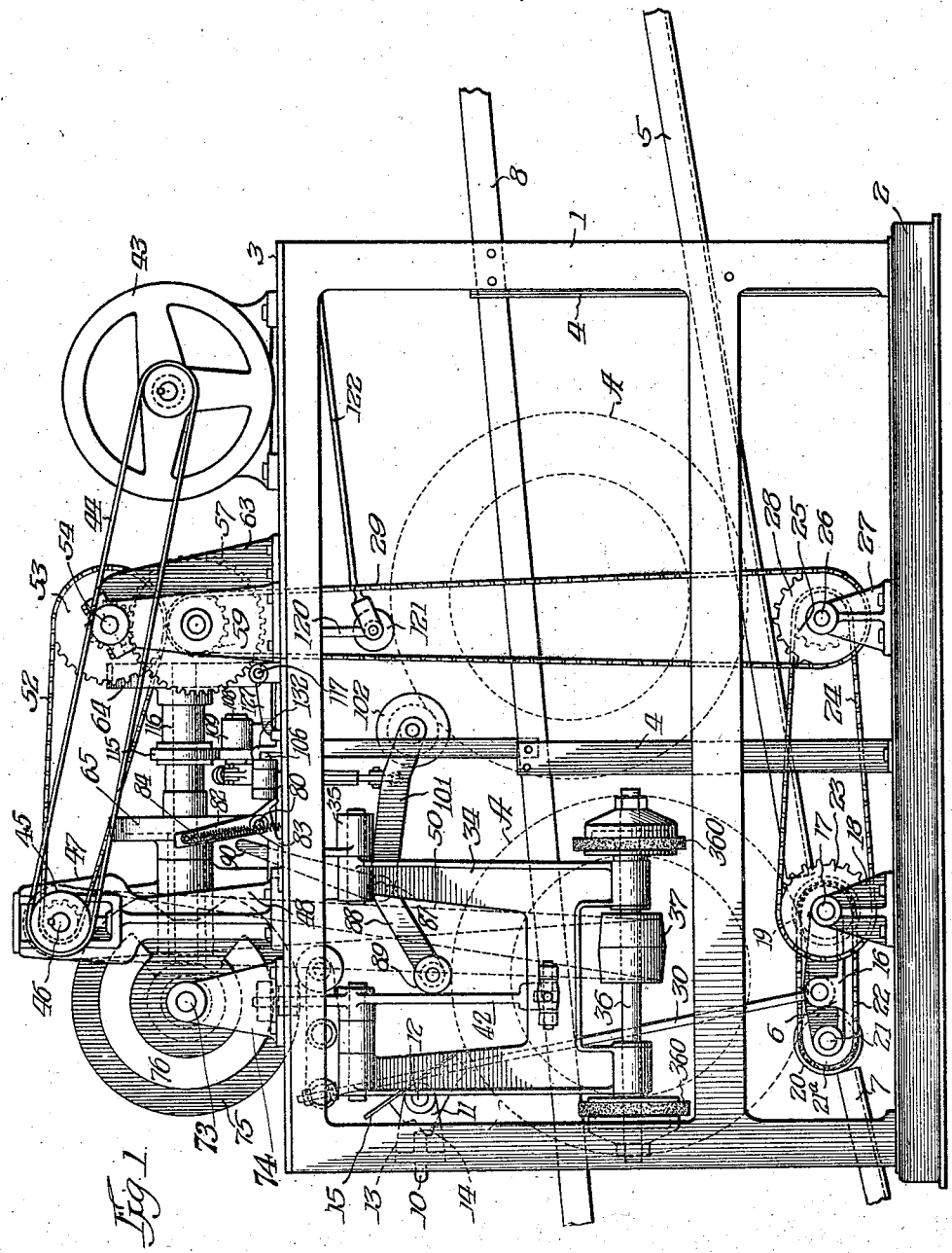
Fig. 1 is a side elevation of a machine constructed in accordance with my invention.
Figure 2:
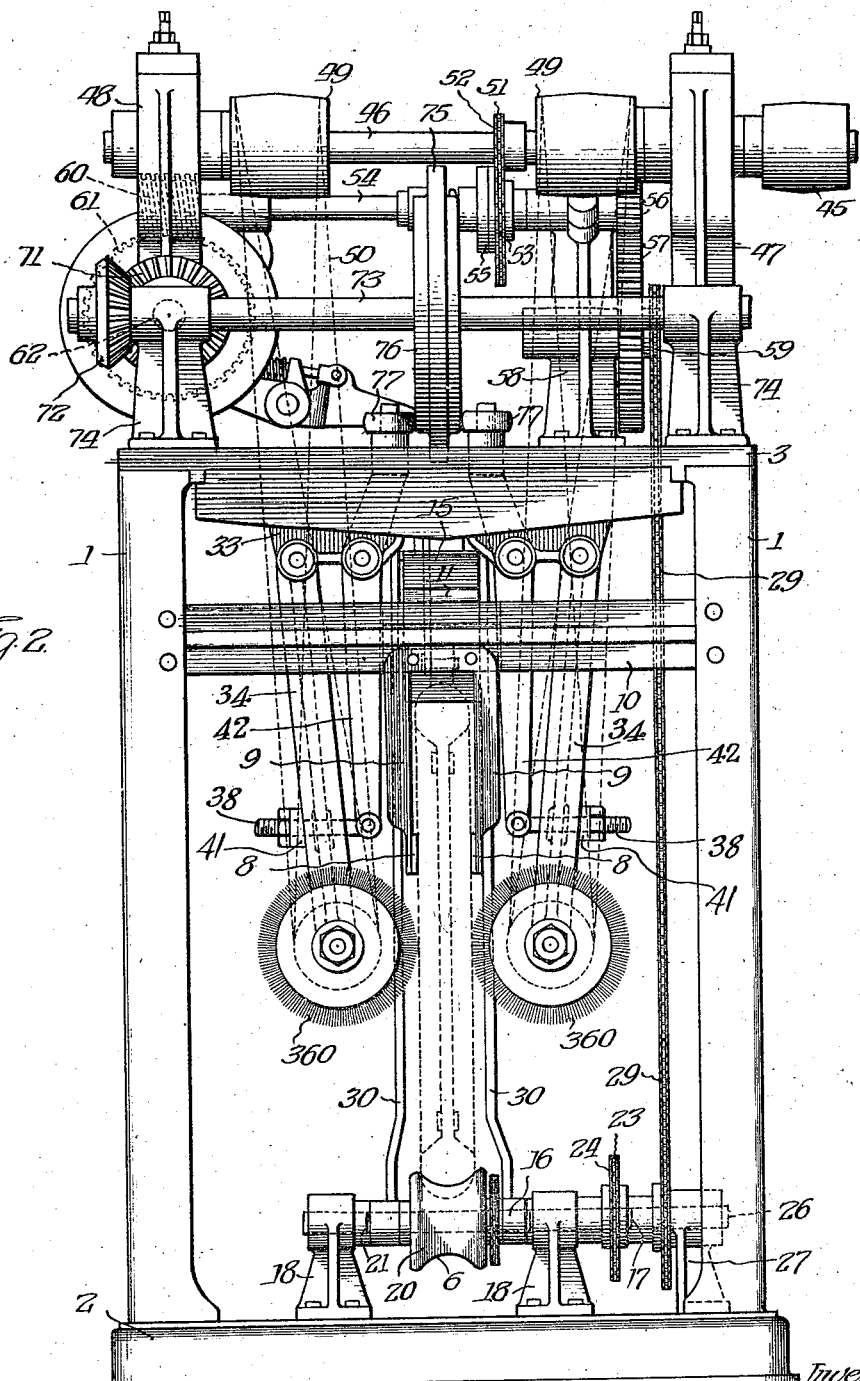
Fig. 2 is an end elevation.
Figure 3:
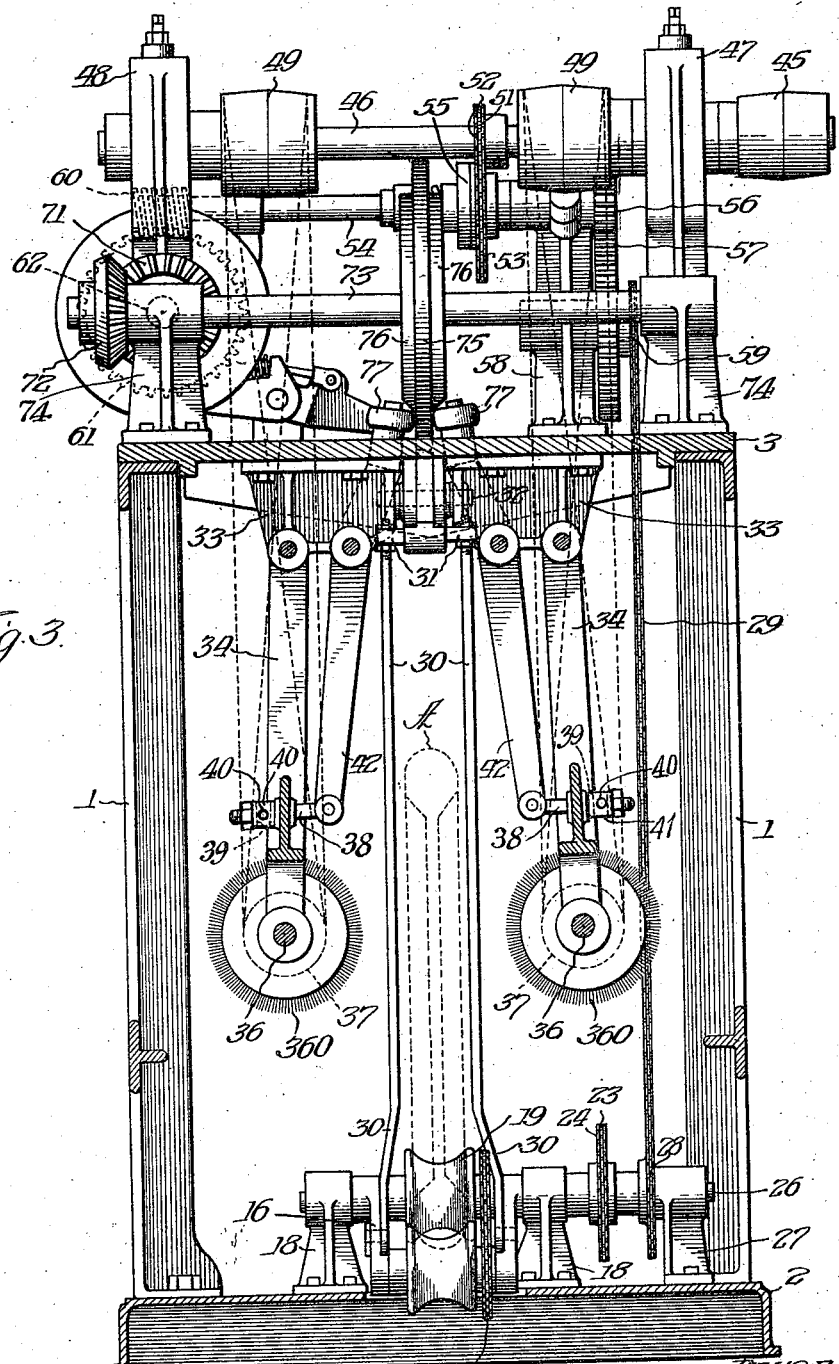
Fig. 3 is a similar view, but with parts shown in section and in different positions.

The numeral 1 represents the side frames of the machine, which are supported upon a base plate 2 and connected by a top plate 3, which carries the driving and control devices for the machine. Attached to the base 2 are vertical brackets or uprights 4, which support a trough or inclined runway 5, down which the cores roll in their passage through the machine, the runway delivering the cores to a core supporting and rotating cradle, indicated in general by the numeral 6, which in turn discharges the cores to an inclined discharge runway 7. Extending through the machine above the runway are parallel guide bars 8, attached to the upper ends of the brackets 4 and to a U-shaped bracket 9, secured to a cross brace 10 connecting the side frames 1 at the discharge end of the machine. These guide bars 8 serve to keep the cores in a vertical plane as they pass through the machine, the propulsion of the core being by gravity, the cradle 6 being arranged and adapted to detain the core while it is being cleaned of adhering particles of cement and dirt.

A core enters the machine on the right of Fig. 1 being delivered from the tire stripping device, and it rolls through the machine, and unless stopped by detaining means to be described later, it is received in the cradle 6 being stopped by a bumper 11. This comprises a block of any suitable material, preferably hard wood, which is pivotally mounted on a shaft 12, carried in brackets 13 formed on the rear of the cross brace 10. As the bumper hangs, its lower end is in the path of the oncoming core being prevented from rocking downward by a finger 14, which bears against the lower side of the cross brace 10. A projecting plate 15 limits the upward movement of the bumper in a manner to be described.

The cradle 6 which supports and revolves the core, comprises a generally H-shaped framework 16 which is pivoted on a shaft 17 mounted in bearings 18 rising from the base plate 2. On the shaft 17 is located a concave roller 19 which, with a roller 20 mounted on a shaft 21 in the outer end of the framework 16, constitute a support for the core. The rollers 19 and 20 are attached to sprockets 21ª which are connected by a sprocket chain 22. The shaft 17 has secured thereto a sprocket 23, which connects by a chain 24 with a sprocket 25, carried on a shaft 26 rotatably mounted in bearings 27 secured to the base of the machine. The shaft 26 carries a sprocket 28, which is connected by a chain 29 with the driving mechanism. By the means which has been described the core is rotated while held in the cradle and subjected to the action of the cleaning brushes.

During the operations on the core, the cradle is supported in horizontal position by parallel hangers 30 which are adjustably connected at their upper ends to a rocking arm 31 which is pivotally mounted on a shaft 32 rotated in brackets 33 suspended from the under surface of the plate 3. During the greater portion of the operation of the machine, the lever 31 is so held that the cradle will be horizontal, but at stated intervals it is released momentarily to discharge the core. The mechanism for performing this function will be described later.

Pivotally mounted on brackets 33 and 35 are swinging arms or frames 34 each of which extends on one side of the core as it rests in the cradle, and each of which carries at its lower end a rotary shaft 36 on the ends of which are mounted two brushes 360 so located as to be opposite that portion of the core which it is desired to clean. The shaft 36 on each side of the core carries a pulley 37 by which it is rotated in a manner to be described.

Passing through each bracket 34 near the lower end is a screw threaded bar 38, the end of which is adjustably received in a hub 39 of a rotary pin 40 which is received in bearings 41 secured in the swinging frame. The other end of the bar 38 is pivotally connected to an operating lever 42 which is rotatably mounted on the bracket 33. The levers 42 are actuated so as to spread the brushes when a core is entering and leaving the cradle and drawn together during the cleaning operation by means operated in timed relation to the actuation of the cradle. The means for performing this function will be described with the control mechanism on the top plate.

On the top plate 3 is secured the motor 43, which, through a belt 44, rotates a pulley 45 on the end of the main drive shaft 46 which is mounted for vertical adjustment in brackets 47 and 48 on the top plate. On the shaft 46 are secured pulleys 49, over which are trained belts 50 that pass through an aperture in the top plate and over pulleys 37, so that the brushes are continuously rotated.

To the shaft 46 is secured a sprocket 51 over which passes a chain 52 to a sprocket 53, which is mounted on the shaft 54 and connected therewith for driving relation by any suitable form of friction driving connection, such as illustrated, for example, at 55. This friction drive is provided to permit slippage should any portion of the machine jam and thus prevent breakage of the machine.

On the end of the shaft 54 is carried a pinion 56 which meshes with a gear 57 rotatably supported in a bracket 58 secured to the top plate, the gear carrying a sprocket 59 over which the chain 29 is trained, which chain drives the cradle rollers.

The shaft 54 at the end remote from the pinion 56 carries a worm 60 which meshes with a worm gear 61 keyed to the end of a shaft 62 extending longitudinally of the top plate in a bracket 63 and in the bracket 48. The shaft 62 is intended to carry two one-revolution-and-stop clutches of any preferred type, one of which is designated by the numeral 64 and the other by the numeral 65. While these clutches may be of any desired form, I have shown them as comprising ratchet disks 66 around which are located sleeves 67 which sleeves carry spring actuated pawls 68 designed to engage the ratchet and cause rotation of the shaft and the sleeve 67 until disengaged by the fingers 69 and 69$^a$. Each finger is actuated in each case by means to cause a locking of the clutch, thereafter assuming its former position to be ready to disengage the clutch as it finishes one revolution. This type of clutch is well known and its action is so familiar that further description is deemed unnecessary.

The clutch 65 is secured to a sleeve 70 rotatably fitted over the shaft 62 the end of the sleeve carrying a miter pinion 71 which engages a miter pinion 72 on a transverse shaft 73 which is located in bearings 74 rising from the top plate. At a midway point of the shaft 73 is a cam 75 which opens and closes the brushes 360 and raises and lowers the cradle 6. The cam is provided with raised flange or ring 76 cut away over a short distance, the ring being designed to contact rollers 77 on the upper ends of the arms 42, the brushes being drawn together by rocking movement of the frames 34 imparted through the levers 42 and spread apart when the rollers reach the gap in the ring.

The periphery of the cam is provided with a notch 78 and the end of the lever 31 carries a roller 79 which rides over the periphery of the cam. When the roller reaches the notch the cradle is lowered as shown in Fig. 4 and the core is discharged. The gap in the ring 76 and the notch 78 are located at the same part of the cam so that the discharge of the core will occur while the brushes are spread. The clutch 65 is so arranged that it will stop just after the cradle is raised and while the brushes are spread thus leaving the parts in position to receive a fresh uncleaned core.

At this point it will be noted that bumper 11 is so designed and pivoted that it will stop a core rolling down the incline 5, but if the core which has been cleaned is prevented from leaving the cradle, as by a jam of cores in the runway 7, when the cradle is lifted the bumper will rock on the pivot 12, and this part of the machine will be protected.

The clutch 65 which operates the cam 75 is connected or disconnected by the finger 69ª keyed on a shaft 80, extending transversely of the top plate 3 and mounted in bearings 81. On the end of the shaft, remote from the finger 69ª, is carried a plate 82 having two feet 83 adapted to bear against the top plate, alternately, the plate being held in tilted position in either direction by a spring 84 connected to the plate 3 and to a pin 85. The arrangement is such that when the shaft 80 is rocked to the left, as shown in Fig. 7, the finger 69ª will release the pawl so that the clutch 65 will be engaged, but when thrown to the right slightly past center it will trip and hold the pawl out of engagement and thus stop the rotation of the cam 75 as the cradle is raised and the brushes are spread apart.

The shaft 80 is actuated by the following means: In a bracket 86 depending from the top plate 3 is located a shaft 87 on the projecting end of which is pivoted an angular lever 88, the lower end of which carries a roller 89 which is so located as to be raised by the core A seated in the cradle. The upper end of the lever 88 projects through an aperture in the top plate and into the recess or passage 90 in a sliding bar 91. This bar is guided for reciprocation by the lever 88, on a pin 92, secured to the top plate and projecting through a slot 93 in the bar and also by a plate 100 secured to the top plate. The lower end of the lever is so weighted that when no core is in the cradle the bar will be moved to the left of Fig. 6.

Pivotally mounted in the bar 91 is a spring actuated pawl 94, the pointed end 95 of which is designed to engage a tooth 96 formed on the lower side of a collar 97 keyed on the shaft 80 between the bearings 81. When the roller 89 drops as a core leaves the cradle, the pawl passes to the left of the collar 97, and when a core enters the cradle it lifts the lever 88 and causes the bar 91 to move to the right which rocks the shaft 80 and the finger 69ª so that the clutch is connected. The finger 69ª remains as shown in Fig. 6 until a trip lever 98 on the side of clutch 65 strikes a cam surface 99 on the finger 69ª, which brings the said finger to a position to disengage the clutch.

The construction which has just been described constitutes a complete device for cleaning and discharging a core. It is necessary, however, to provide some means of detaining the cores in the runway 5 until the machine is ready to operate upon them, as often the cores are delivered faster than the machine can clean them.

For the purpose of holding back or detaining the cores until the cradle 6 is discharged of the core contained therein, and of then delivering one core to the cradle, the mechanism to be described is provided and while other means may be constructed for this purpose, that shown herein has been found satisfactory for the performance of this work.

On the shaft 87 is pivoted an arm 101 on the end of which is located a roller 102 which projects within the path of the oncoming core, and will stop it, while the lever is in lowered position, but will release it upon elevation of the lever. Pivoted to the lever is an adjustable link 103 which is pivoted in turn on a pin 104 on the outer end of an arm 105. The pin 104 has a flattened head 106 projecting to the right as shown in Fig. 7 for a purpose to appear later.

The arm 105 is bifurcated at its inner end and is received on either side of a second arm 107, the two arms being pivotally connected to form a single operating lever, on a pin 108, mounted in a bracket 109 secured to the plate. The arm 105 is provided with a lug 110 to which is pivotally connected a pin 111 which is slidably received in a lug 112 on the arm 107. A spring 113 surrounds the pin 111, the purpose of which is to provide a yielding connection between the two portions of the lever. The end of the arm 107 carries a roller 114 which bears against a cam 115 secured to the sleeve 116, of the clutch 64. As the clutch 64 revolves, when the pawl 68 thereof is engaged, the cam rocks the compound lever and raises the roller 102, releasing the waiting core and allowing it to move by gravity to the cradle. The hinged construction of the two parts of the lever is provided so that movement of the part 107 relative to the part 105 is permitted in order to prevent breakage of the arm in case the end of the lever is not released from holding means to be described.

The clutch 64 is operated by the finger 69 which is secured to the end of a shaft 117, mounted to oscillate in bearings 118, secured to the top plate. The shaft 117 is oscillated by a lever 119, which is actuated by a vertical pin 120 which extends downward through the top plate and is connected to the axis of a roller 121 which is carried on the end of an arm 122. The roller 121 projects within the path of the core A as it rolls down the runway 5. The pin 120 is arranged to move independently of the lever 119, the motion of the roller 121 being transmitted to the lever by a coil spring 124 surrounding the pin and held between a collar 123 on the pin and the arm of the lever. Nuts 125 on the upper end of pin 120 prevent it from falling out of place when no core is below the roller 121.

One end of the lever 119 is provided with a tail piece 126 which bears against the top plate and the other end is provided with a tapering head 127 which is arranged to bear upon the upper surface of the slide 91. The end of the slide 91 is inclined as at 128, so that it may enter between the head 127 and the top plate. The arrangement is such that when the plate 91 is at the right hand end of its travel, which occurs when the core is in the cradle, as in Fig. 6, the shaft 117 cannot oscillate and the finger 69 is in position to hold the clutch in disengagement. If now a second core enters the machine, it raises the roller 121 and places the spring 124 under compression. At this time the core is detained by the roller 102. When the first core leaves the cradle 6 the arm 88 is rocked to the left which moves the plate 91 and the end 127 of the arm 119 drops down off the plate 91, under action of the spring 124, moving the finger 69 to the left as shown in Fig. 4, and connecting the clutch 64 for a single revolution which raises the roller 102 by operation of the cam 115. Of course, if there is no core in the cradle the arm 119 is rocked by the roller and the core is immediately passed through the machine to the cradle.

In order to prevent the momentum of the core raising the roller 102, means are provided for locking the roller in place. This comprises a slide 129 which is guided for endwise movement by a bolt 130 and a strap 131, the left hand end of the slide being provided with a hook 132 which passes over the squared end 106 of the pin 105 to hold the compound lever 105 and 107 in lowered position. The slide 129 is moved by a spring 133 surrounding a pin 134 extending from its rear end and guided in a bracket 135. It is moved in the opposite direction by a projection 136 on a collar 137 secured to the shaft 117. It will be seen that when the clutch 64 is operated to raise the roller 102 the catch 132 will be withdrawn. Should the catch stick for any reason the jointed construction of the lever for raising the roller will permit rotation of the cam 115 without breaking the lever.

Operation.

The operation of the core cleaning machine will be understood from the description which has been given. As the cores roll into the machine down the runway 5 they will first raise the roller 121, which through the clutch 64 will raise the barrier 102 permitting the core to enter the cradle. When the core reaches the cradle the roller 89 will be raised which will move the bar 91 to the right as shown in Fig. 6. This will rock the finger 69ª to permit the clutch 65 to be connected and the cam 75 will draw the brushes together to clean the core which starts to rotate upon its own axis as soon as it rests on the continuously driven rollers 21 constituting the cradle.

When the cam 75 rotates so that the cradle is lowered the core will be discharged and the cradle raised again to receive another core. At this point, trip lever 98 engages cam 99, causing finger 69ª to disengage the clutch 65, thus stopping disk 75 in position to hold the cradle in raised position and to allow the brushes to remain spread apart ready to receive the next core. Whereupon, the sequence of movements incident to the receipt of the core upon the cradle will follow, as given in the above paragraph.

When the roller 89 was raised the end 128 of the bar 91 passed beneath the end 127 of the lever 119 which action brought the finger 69 back to vertical position and locked the roller 102 down by the catch 132. As a new core enters the machine it is stopped by the roller 102 and prevented from entering the cradle until the first core is discharged, whereupon the bar 91 moves to the left and permits the lever 119 to trip the clutch 64 and the sequence of motion is resumed.

While the description of the various parts has been detailed to enable one skilled in the art to understand the invention, embodiments of the invention are not restricted to the exact form or arrangement and equivalent means may be used to accomplish the same results. Such equivalents as come within the scope of the invention and the appended claims are intended to be covered herein.

Claims:

1. A machine for treating tire cores, comprising a structure having a passageway for the cores, a cradle for a core in said passageway, means to operate upon the sides of the core, said means being movable toward and from the core, power means for actuating said operating means, and means actuated by the core in the cradle to control said power means so that it will move said first named means toward the core.

2. A machine for treating tire cores, comprising a structure having a passageway for the cores, means in said passageway for holding and rotating a core, a brush movable toward and away from the side of the core, power operated mechanism for moving the brush, a trip mechanism actuated by the core as it is located in said holding means to control said power operated mechanism so that it will move the brush toward and away from the core.

3. A machine for cleaning tire cores or similar annular objects, comprising a device for holding and rotating a core, a brush movable toward and away from the core, power means for moving the brush and means actuated by the core for controlling operation of the brush moving means whereby it will move the brush toward the core.

4. A machine for cleaning tire cores, or similar annular objects, comprising a cradle for holding and rotating a core, a brush movable toward and away from the core, a rotatable control device for moving the brush toward and away from the core, actuating means for said control device and means tripped by said core for setting the control device in operation.

5. A machine for cleaning tire cores, or the like, comprising a core holding and rotating device, a structure providing a path for cores leading to said device, a brush movable toward and away from the core in said device, a tripping device in the path of the core to the device and actuated thereby, means for moving said brushes toward and away from the core in said device, power means for operating the brush moving means, said power means being set in motion by the tripping device.

6. A machine for cleaning tire cores, comprising means to hold and rotate a core, a brush movable toward and away from the core, means to move said brush, a source of power, a clutch between the source of power and the brush moving means, and means actuated by the core as it passes the first means to operate said clutch for driving relation.

7. A machine for cleaning tire cores, comprising a core holder, a brush movable toward and away from the core, a cam to move the brush in the manner stated, driving means adapted to be connected to said cam to rotate the same and means to cause a single operation of the cam, said means being adapted to be actuated by the presence of the core in the holder.

8. A machine for cleaning tire cores, comprising a cradle, means for delivering a core to said cradle, a brushing device, a support for said device, means to move said support toward and away from the core, power means to move the support as stated, and a trip for said power means operated upon entrance of the core in the cradle.

9. A machine for cleaning tire cores, comprising a cradle, means for delivering a core to said cradle, a brushing device movable toward and away from the side of the core and normally tending to move away from the core, a rotary cam for permitting movement of the brush away from the core and moving it toward the core, actuating means adapted to rotate said cam, means for holding said cam stationary with the brush at its far limit of movement, and means actuated by the core as it enters the cradle to set the cam in motion.

10. A machine for cleaning tire cores, comprising a cradle, means for delivering a core to said cradle, brushes movable toward and away from the side of the core and normally tending to move away from the core, a single device for permitting movement of the brushes away from the core and moving them together toward the core, said device, when stationary, acting to permit the brushes to spread apart, power means for actuating said device and means actuated by the core as it enters the cradle for operating the power means to actuate said device to draw the brushes together against the sides of the core.

11. In a machine for the purpose set forth, a core rotating means, brushing means normally removed from the core, actuating means, and means operable therefrom for automatically moving the brushing means toward the core when the core enters the rotating means, to bear against the side of the core.

12. In a machine for the purpose set forth, a core rotating means, brushing means normally removed from the core, actuating means, means operable therefrom for automatically moving the brushing means toward the core when the core enters the rotating means, to bear against the side of the core, and means to discharge the core from the rotating means when the brushing operation is completed.

13. In a machine for the purpose set forth, a core rotating means, brushing means normally removed from the core, actuating means, means operable therefrom for automatically moving the brushing means toward the core when the core enters the rotating means, to bear against the sides of the core in rotation, and means to discharge the core and spread the brushing means upon completion of the brushing operation.

14. In a machine for the purpose set forth, a core rotating means, brushes normally removed from the core, means for moving the brushes toward the core, power means adapted to rotate said moving means, means actuated by the core for controlling operation of the moving means whereby said moving means permits spreading of the brushes and discharging of the core upon completion of the brushing operation.

15. In a machine for the purpose set forth, a motive means, a cradle for supporting a core and rotating it, an inclined runway leading to the cradle, means for tilting the cradle, a brush normally removed from the path of the core, and means adapted to be connected to the motive means when the core enters into the cradle for moving the brush against the side of the core.

16. In a machine for the purpose set forth, a cradle for supporting a core and rotating it, means to hold the cradle in horizontal position, and tilt it to discharge the core, a brush to clean the side of the core, and means acting in timed relation to the completion of the brushing operation to actuate the first mentioned means to tilt the cradle.

17. In a machine for the purpose set forth, means for causing a core to roll into the machine, means for cleaning the core while it is in the machine, and means for discharging the core at the end of the cleaning operation, said discharging means being operated automatically in timed relation to the completion of the cleaning operation.

18. In a machine of the character set forth, a structure providing a passageway along which the core may travel through the machine, said structure providing a cleaning station in said passageway, a barrier in front of said cleaning station, and means for holding said barrier in the passageway adapted to be actuated by a core in the cleaning station.

19. In a machine of the character set forth, a structure providing a passageway along which a core may travel through the machine, said structure providing a cleaning station in said passageway, a barrier in front of said cleaning station, means for holding said barrier in said passageway adapted to be actuated by a core in the cleaning station, and mechanism to remove the barrier operable by movement of a core from the cleaning station.

20. In a machine of the character set forth, a structure having a passageway along which a core may travel through the machine and a cleaning station in said passageway, a barrier in front of said cleaning station, a mechanism to remove the barrier, and means to prevent operation of said mechanism if a core is in the cleaning station.

21. In a machine of the character set forth, a structure providing an inclined core passageway and a cleaning station at the lower end of the passageway, a barrier in front of the station, mechanism adapted to remove the barrier, and a trip in the path of the core at the upper side of the passageway to set said mechanism in operation.

22. In a machine of the character set forth, a structure providing an inclined passageway and a cleaning station at the lower end of the passageway, a barrier in front of the station, mechanism adapted to remove the barrier, a trip in the path of the core in front of the barrier to set said mechanism in operation, and means to prevent the effective movement of the trip should there be a core in the cleaning station.

23. In a machine of the character set forth, a structure providing an inclined passageway and a cleaning station at the lower end of the passageway, a barrier in front of the station, mechanism adapted to remove the barrier, a spring actuated trip, means to store energy in the spring actuated by the oncoming core, and means to release that energy to operate the trip upon removal of a core from the cleaning station.

24. In a machine of the character set forth, a structure providing a passageway for cores through the machine, a cradle in the passageway, brushes movable toward and away from a core in the cradle, means for tilting the cradle to discharge a core, a barrier in the passageway in front of the cradle, a constantly rotating shaft, two clutches on said shaft, a cam rotated by one of said clutches, said cam controlling the operation of the brushes and the cradle, a second cam rotated by said second clutch, said second cam removing the barrier, and means to trip said clutches, said means being operated by the core.

WILLIAM C. STEVENS.